United States Patent
Chaffee (10) Patent No.: US 9,759,338 B2
(45) Date of Patent: *Sep. 12, 2017

(54) VALVE FOR AN INFLATABLE DEVICE

(71) Applicant: Robert B. Chaffee, Portland, ME (US)

(72) Inventor: Robert B. Chaffee, Portland, ME (US)

(*) Notice: Subject to any disclaimer, the term of this patent is extended or adjusted under 35 U.S.C. 154(b) by 35 days.

This patent is subject to a terminal disclaimer.

(21) Appl. No.: 14/704,892

(22) Filed: May 5, 2015

(65) Prior Publication Data

US 2015/0233486 A1    Aug. 20, 2015

Related U.S. Application Data (63) Continuation of application No. 12/821,756, filed on Jun. 23, 2010, now Pat. No. 9,022,051.

(60) Provisional application No. 61/219,653, filed on Jun. 23, 2009.

(51) Int. Cl.
F16K 15/20    (2006.01)

(52) U.S. Cl.
CPC .......... *F16K 15/20* (2013.01); *Y10T 137/0402* (2015.04); *Y10T 137/374* (2015.04)

(58) Field of Classification Search
CPC ...... F16K 15/20; F16K 15/202; F16K 15/205; F16K 15/207; F16K 15/06; F16J 15/02; A47C 27/082; Y10T 137/374; Y10T 137/9247
USPC ................ 137/232, 800; 277/630, 637, 644; 220/85 VR, 86 R, 202, 203, 209, 203.25, 220/203.26, 303, 378, DIG. 32, DIG. 33
See application file for complete search history.

(56) References Cited

U.S. PATENT DOCUMENTS

| | | | |
|---|---|---|---|
| 2,638,113 | A | 5/1953 | Sturmer |
| 3,724,488 | A | 4/1973 | Featherstone |
| 3,983,907 | A | 10/1976 | Sorensen |
| 4,460,104 | A | 7/1984 | Kitsukawa |
| 4,579,141 | A | 4/1986 | Arff |
| 4,724,868 | A | 2/1988 | Kasugai et al. |
| 4,726,488 | A | 2/1988 | Kasugai |
| 4,766,628 | A | 8/1988 | Walker |
| 4,785,961 | A | 11/1988 | Kasugai et al. |
| 5,238,136 | A | 8/1993 | Kasugai et al. |
| 6,089,251 | A | 7/2000 | Pestel |
| 6,161,841 | A | 12/2000 | Shaw |

(Continued)

OTHER PUBLICATIONS

International Preliminary Report on Patentability from International Patent Application No. PCT/US10/39637 mailed Jun. 9, 2011.

(Continued)

*Primary Examiner* — Craig J Price
(74) *Attorney, Agent, or Firm* — Lando & Anastasi, LLP (57) ABSTRACT

A valve for an inflatable device is disclosed. The valve includes a base configured to seal to a fluid impermeable wall of a bladder of the inflatable device, a cap including a rim, and a seal. The bases defines an orifice for exhausting fluid from an interior of the inflatable device and a sealing surface. The rim can include a generally circular peripheral region including at least one rib located about an underside of the peripheral region and a cavity defined in part by at least one wall located radially inward of the rib. The seal can include a first end region secured to the cap within the cavity between the at least one wall and the at least one rib and a second end region configured to move with the at least one first end region secured to the cap.

24 Claims, 5 Drawing Sheets

(56) References Cited

U.S. PATENT DOCUMENTS 7,146,923 B2 12/2006 Polley et al.
7,665,624 B2 2/2010 Enomoto et al.

OTHER PUBLICATIONS

Search Report for Chinese Patent Application No. 2010800377169 mailed Sep. 4, 2013, 2 pages.

VALVE FOR AN INFLATABLE DEVICE

RELATED APPLICATIONS

This application is a continuation of and claims priority under 35 U.S.C. §120 to U.S. patent application Ser. No. 12/821,756, entitled "VALVE FOR AN INFLATABLE DEVICE," filed Jun. 23, 2010, which issued as U.S. Pat. No. 9,022,051 on May 5, 2015. This application claims priority under 35 U.S.C. §119(e) to U.S. Provisional Application Ser. No. 61/219,653, entitled "EXHAUST VALVE FOR INFLATABLE DEVICE," filed on Jun. 23, 2009 which is herein incorporated by reference in its entirety.

BACKGROUND OF INVENTION

1. Field of Invention

Embodiments of the invention generally relate to inflatable support devices. More specifically, at least one embodiment relates to an apparatus, system and method employing a valve for an inflatable device.

2. Discussion of Related Art

Currently, inflatable devices such as mattresses, cushions and pillows can include any of a variety of fluid controllers that provide for inflation of the device using an electrical pump or other types of inflation devices. Some types of fluid controllers also provide for deflation of the inflatable device. In general, inflatable devices include a separate valve that can be opened by the user independent of operation of the fluid controller to exhaust fluid from the inflatable device.

SUMMARY OF INVENTION

Various aspects provide a reduce-force operation of manually operated valves for inflatable support devices. Apparatus, systems and methods can be provided to allow a user to more easily operate manually-operated valves included in inflatable devices, for example, to more easily operate manually-operated exhaust valves. Such apparatus, systems and methods can include large-orifice exhaust valves configured to allow a user to more easily open and close a valve that provides a fluid-tight seal when closed and a large volume passage when open. According to one embodiment, the preceding is achieved, at least in part, by using a deformable seal configured to provide sealing pressure in a plurality of directions as the seal is engaged between a cap and a body of the valve. In some embodiments, the deformable seal includes a body that folds back on itself when the valve is closed such that the sealing-pressure provided by the seal is provided in a direction that is non-axial relative to a central axis of the valve, for example, substantially perpendicular to a direction of fluid flow that occurs when the valve is open. According to various aspects, an increased diameter manually-operated valve can be provided where the force required to close the valve in a fluid-tight manner is greatly reduced to allow a rapid transfer of fluid while reducing the type of difficulties users traditionally experience when manually closing large-diameter valves.

According to one aspect, a valve is provided for an inflatable device that is shaped and configured to support at least a portion of a user where the valve includes a base including a first region configured to seal to a fluid impermeable wall of a bladder of the inflatable device, a cap including a rim, and a seal. According to some embodiments, the base includes a second region that defines an orifice for exhausting fluid from an interior of the inflatable device, the second region configured to provide a sealing surface. Further, the rim can include a generally circular peripheral region including at least one rib located about an underside of the peripheral region and a cavity defined in part by at least one wall located radially inward of the rib. Still further, the seal can include a first end region secured to the cap within the cavity between the at least one wall and the at least one rib and a second end region configured to freely move with the at least one first end region secured to the cap. According to some embodiments, the second end region of the seal is configured to press into engagement with the sealing surface to produce a force between the seal and at least one of the base and the cap that is substantially perpendicular to a central axis of the orifice when the cap is secured to the base to provide a fluid tight seal.

According to another aspect, a method of sealing an orifice of an inflatable body support device using a valve having a cap and a base is provided. According to some embodiments, the method includes acts of providing a seal in the valve, the seal including a first end region secured to the cap and a second end region configured to freely move with the at least one first end region secured to the cap, deforming the seal between the cap and the base by attaching the cap to the base to move the second end region radially inward, relative to a central axis of the orifice, to form a fluid-tight seal between the cap and the seal; and forming the fluid-tight seal with at least one sealing force that is substantially perpendicular to the central axis.

According to a further embodiment, the valve includes a large-orifice exhaust valve, and the method further includes acts of securing the base and the cap together to provide the fluid-tight seal using a rotational force that is at least 25% less than a rotational force required to close a conventional large-orifice exhaust valve that is configured to compress a gasket in an axial direction to close the conventional exhaust valve.

According to a still further embodiment, the valve includes an orifice having a cross-sectional area that is at least 66% greater than a cross-sectional area of the orifice of a conventional valve.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Figure 1:
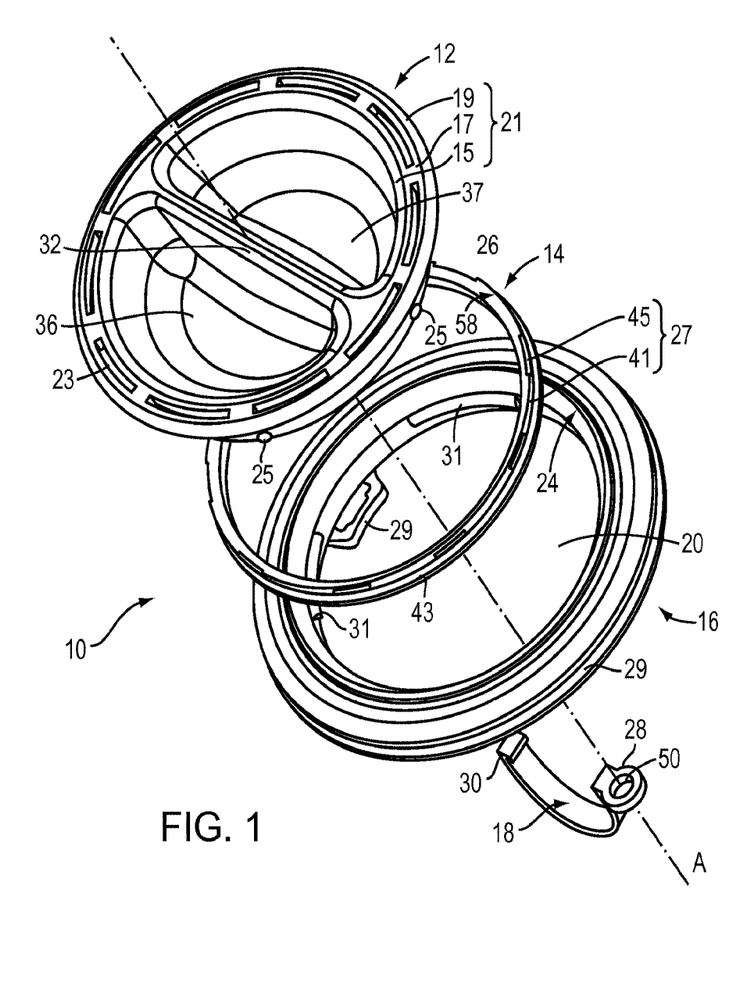
FIG. 1 illustrates an exploded view of a valve in accordance with some embodiments.

FIG. 1 illustrates a valve 10 for an inflatable device in accordance with one embodiment. In accordance with the illustrated embodiment, the valve 10 includes a cap 12, a seal 14, a base 16 and a connector 18. The base defines an orifice 20 through which, depending on the embodiment, fluid can be added to and/or removed from the inflatable device. According to some embodiments, the valve 10 is an exhaust valve configured to provide a fluid path via the orifice 20 by which fluid in the inflatable device can be exhausted to ambient. Further, according to some embodiments, when the valve 10 is closed, the engagement of the cap 12 with the base 16 provides a fluid tight seal. As used herein the term "fluid-tight" refers to the fact that fluid cannot pass through the valve, for example, at the fluid pressures for which the valve is designed.

According to some embodiments, the cap 12 includes a rim 21. In the illustrated embodiment, the rim 21 of the cap 12 includes an inner region 15, a central region 17 and a peripheral region 19. According to a further embodiment, each of the inner region 15, the central region 17 and the peripheral region 19 extend a full 360 degrees about the rim 21. According to various embodiments, the central region includes at least one slot 23. FIG. 1 illustrates an axis A which is a central longitudinal axis for the orifice 20. Thus, for example, the slot 23 can include a single slot that extends around the central region for a majority of the 360 degrees about the axis A. Further, in accordance with the illustrated embodiments, the central region 17 can include a plurality of slots 23, for example, two large slots, or a plurality of shorter slots. According to some embodiments, the slots are provided to allow tooling used during manufacture to directly access an underside of the rim 21 to form molded structure (such as a projection) included on the underside of the rim. Thus, for example, the slots can be provided by a mold used in the manufacture of the cap 12 by injection molding. In addition, in various embodiments, the cap can include structure 25 that allows the cap 12 to engage and be attached to the base 16 in a fluid-tight arrangement. The structure 25 can, for example, include any of a bayonet-style connection, a full thread and a partial thread either alone or in combination with a bayonet-style connection.

In the illustrated embodiment, the cap 12 also includes a first recessed portion 36, and a second recessed portion 37 divided by a raised longitudinal section 32. According to some embodiments, the cap 12 can include a grip which is sized and shaped to allow a user to more easily manipulate the cap 12 to open and close the valve 10. For example, in the illustrated embodiment, the raised longitudinal section 32 provides a region that can be gripped by the user so that the cap 12 can be rotated as it is threaded or unthreaded from the base 16. It should be appreciated that the cap 12 can have different shapes depending upon the manner in which the cap 12 should be manipulated to open and close the valve. For example, in embodiments where the cap 12 is pushed into the base to close the valve 10, the region of the valve that provides the grip may include a lip that allows a user to better grip the cap 12 when opening or closing the valve 10 using a primarily linear motion.

According to some embodiments, the base 16 includes a central region 22, an inner face 24 and a lip 29. According to the illustrated embodiment, the inner face 24 defines the orifice 20 that provides a fluid path from an interior to an exterior of the inflatable device with which the valve is used. In addition, in various embodiments, the base 16 can include structure 31 that allows the cap 12 to be attached to the base 16 in a fluid-tight arrangement. The structure 31 can, for example, include any of a bayonet-style connection, a full thread and a partial thread either alone or in combination with a bayonet-style connection.

According to various embodiments, the cap 12 is threaded to the base 16 to close the valve and form a fluid tight seal. According to the illustrated embodiment, the cap 12 and the base 16 are equipped with partial threads that allow the valve to be opened and closed by a relatively small (for example, less than 120 degree) rotation of the cap relative to the base. According to one embodiment, the rotation is less than approximately 120 degrees while in another embodiment the rotation required to create the fluid-tight seal by attaching the cap 12 to the base 16 is no greater than 90 degrees. According to further embodiments, the shape and materials of construction of the seal 14 provide a relatively elastic structure that is deformable with a limited amount of pressure. Thus, according to some embodiments, the preceding features of the seal allow the cap to be attached to the base in a fluid-tight arrangement with a minimal rotation of the cap, that is, with a limited amount of axial travel relative to the axis A.

According to some embodiments, the seal 14 of the valve 10 is a separate item relative to each of the cap 12 and the base 16 but is attached to one or the other of the cap 12 and the base 16, for example, in some embodiments the seal is permanently attached to one of the cap 12 and the base 16. According to another embodiment, the seal 14 is semi-permanently attached to one of the cap 12 and the base 16 such that it is not accidentally removable during normal use but can be separated from the other components by the user for cleaning or replacement. In any of the preceding embodiments, the seal 14 can include compressible material such that a fluid tight seal is formed as a result of the compression of the seal 14 created by the engagement between the cap 12 and the base 16 when the valve 10 is closed.

According to further embodiments, the seal is constructed of a gasket material that has a relatively low compressibility but that is configured to provide an overall shape that can more easily be deformed. As is described in further detail, embodiments of the valve 10 can include a structure that creates a fluid-tight seal by deforming the overall shape of the gasket when a force is applied to attach the cap 12 to the base 16. In some embodiments, to further assist in forming a fluid-tight seal when the valve 10 is closed, the seal 14 is manufactured from a compressible material that is configured in an overall shape that can more easily be deformed. Molded silicon provides one example of a material of the seal 14. Further, in various embodiments, the seal 14 can be manufactured from a material that has a hardness measured in the Durometer range of 65-75 A. According to one embodiment, the seal 14 can be manufactured from a material that has a hardness measured as the Durometer value of 70 A.

According to some embodiments, the seal 14 can include a first region 26 including a first arcuate surface 58 constructed to create a fluid-tight seal with the cap 12 when the cap 12 is attached to the base 16 to close the valve. According to the illustrated embodiment, the first arcuate surface 58 extends at least 180 degrees about a face of the seal 14 that is radially inward relative to the end regions of the seal 14. In further embodiments, the first arcuate surface 58 extends greater than 180 degrees about the outer surface of the seal. In some embodiments, the first arcuate surface 58 provides a continuously curved surface. In other embodiments, the first arcuate surface 58 provides an overall arcuate shape but can include one or more flat sections, for example, a flat section located between two curved portions of the surface.

According to further embodiments, the seal 14 includes a second region 27 that is radially outward relative to a location of the first region 26. In some embodiments, the second region 27 includes at least one first end region 41 and at least one gap 45. According to the illustrated embodiment, each of the at least one gap 45 separates adjacent portions of the at least one first end region 41. According to one embodiment, the at least one first end region 41 includes a plurality of end regions 41 each including a protrusion separated from adjacent protrusions included in the plurality of end regions by a gap included in the at least one gap 45. According to another embodiment, the seal does not include any of the at least one gap 45. Instead, according to this embodiment, the at least one first end region 41 extends around the full 360 degrees of the seal 14 (relative to the axis A) in the second region 27 to, for example, provide an outer periphery of the seal 14.

In some embodiments, the seal includes a second end region 43. According to the illustrated embodiment, the second end region is also located radially outward relative to the location of the first region 26. According to the illustrated embodiment, the seal 14 has an overall shape that is similar to the letter C such that each of the at least one first end region 41 and the second end region 43 is located radially outward relative to the first region 26. As is described in greater detail further herein, the first arcuate surface 58 can extend continuously from the at least one first end region 41 to the second end region 43.

In some embodiments, the seal 14 is provided as a separate component attached to at least one of the cap 12 and the base 16 as illustrated in FIG. 1 because the material that the seal 14 is manufactured from may be more costly than the material(s) that either the cap 12 or the base 16 are manufactured from. In addition, even where the material of the seal 14 has limited compressibility, the material may not provide a degree of rigidity desired for either or both of the cap 12 and the base 16. According to one embodiment, however, the seal 14 is included in the base 16 of rigid over-molded material.

According to various embodiments, all or a portion of the cap 12 and the base 16 are manufactured from plastic, for example, molded plastic such as ABS. Further, the cap 12 and the base 16 can each be manufactured, at least in part, by an injection-molding process.

It should be appreciated, however, that the seal 14 need not be a separate component but may in alternate embodiments, be included (or have one or more of its features included) in either of the cap 12 or the base 16. For example, according to one embodiment, the base 16 includes a surface that is configured to engage a surface of the cap 12 to form a fluid-tight seal when the valve 10 is closed. In an alternate embodiment, the cap 12 includes a surface that is configured to engage a surface of the base 16 to form a fluid-tight seal when the valve 10 is closed. For example, the cap 12 or the base 16 can include an integral structure that provides the first region 26 including the first arcuate surface 58, and in some embodiments, also provides the at least first end region 41 and the second region 43. In further embodiments, at least one of the at least first end region 41 and the second region 43 are free to move prior to engagement of the cap 12 and the base 16.

According to a further embodiment, the connector 18 fastens the cap 12 to the base 16 such that the cap 12 cannot be misplaced when the valve is open. According to some embodiments, the connector 18 allows the cap 12 to be manipulated to open and close the valve 10 without detaching from the base 16. According to the illustrated embodiment, the connector includes a first end 28 that includes an opening 50 and a second end 30. Further in the illustrated embodiment, the base includes a receiving element 46. According to the illustrated embodiment, the first end 28 of the connector 18 is attached to the underside of the cap 12, for example, at a central location which coincides with the intersection of the axis A and the underside of the cap 12. In this embodiment, the second end 30 of the connector 18 is connected to the base 16 at the receiving element 46.

According to some embodiments, the valve is employed as an exhaust valve in an inflatable comfort device where the orifice 20 provides a diameter that is substantially larger than the size of the orifice provided by exhaust valves which are presently employed in inflatable comfort devices. Conventional exhaust valves often include an opening or orifice having a diameter of 2.25 inches or less. Conventional manually operated valves having larger orifices become difficult to open and close as the orifice diameter increases because the force required to obtain a fluid-tight seal with larger valves is difficult for many users to achieve. This difficulty results in large part from the pressure required to compress the gasket included in a conventional valve as the size increases because such gaskets are squeezed in a solely or primarily axial direction relative to the longitudinal axis of the valve. Often, the required compression must be achieved as the cap is threaded on the valve. Further, the traditional o-ring gasket construction provides a structure with a shape that does not include any features that allow the o-ring to be more easily compressed.

In contrast, the deformable nature of the seal 14 included in the valve 10 reduces the rotational force required to thread the cap 12 to the base 16 because deformation of the seal 14 is accomplished with a greatly reduced force as a result of a shape of the gasket. In general, the valve 10 is sized to provide a substantial increase in the diameter, and consequently, the cross-sectional area of the orifice relative to conventional valves. Further, the increase in cross-sectional area provides a corresponding increase in fluid flow. For example, according to one embodiment, the orifice included in such an exhaust valve has a diameter greater than or equal to 2.8 inches. According to other embodiments, the diameter can be 2.8 to 3.4 inches. In particular, when compared with the conventional 2.25 inch valve, embodiments with a 2.9 inch diameter can provide an increase of 66% in cross-sectional area and fluid flow. Embodiments with a 3.2 inch (7.62 centimeter) diameter can provide an increase of 100% in cross-sectional area and fluid flow.

Figure 2:
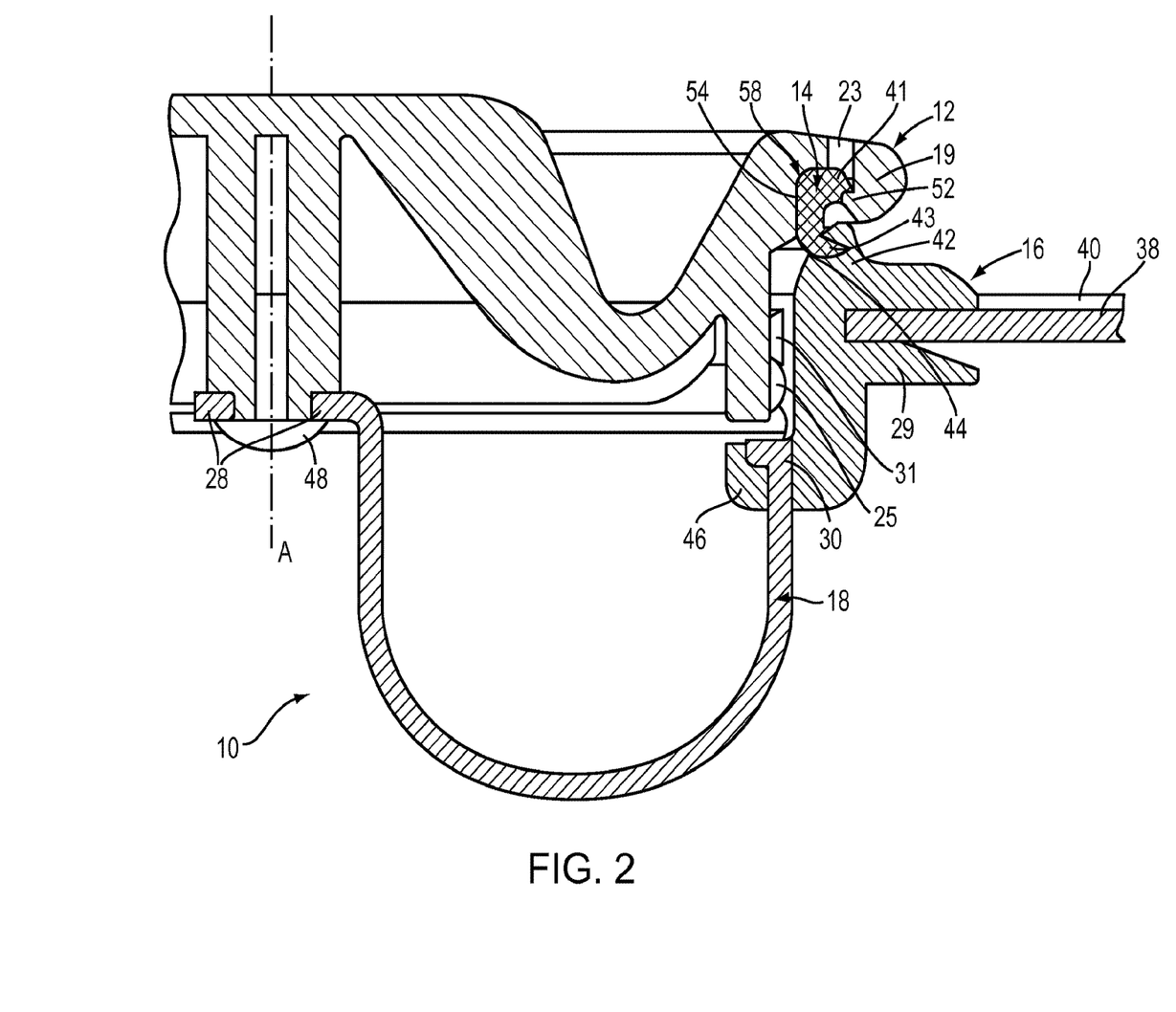
FIG. 2 illustrates a cross-sectional view of a portion of a valve in accordance with one embodiment of the valve illustrated in FIG. 1.

Referring now to FIG. 2, a cross sectional view of a portion of the valve 10 of FIG. 1, is illustrated in accordance with some embodiments. The valve 10 illustrated in FIG. 2 is illustrated in an assembled state and with the cap 12 and the base 16 not fully engaged. Accordingly, the seal 14 is illustrated in an un-deformed state. According to one embodiment, the base 16 includes a first region 38, a second region 42 that includes a recessed portion 44.

According to one embodiment, the first region 38 is provided to facilitate an attachment of the valve 10 to a wall 40 of the inflatable device. In the illustrated embodiment, the first region 38 is provided about the outer periphery of the base 16. According to one embodiment, the first region 38 is located in the base 16 between the second region 42 and the lip 29. In some embodiments, the base including the first region 38 is formed from a single piece of material. In other embodiments, the first region 38 is a first component of the base 16 which is permanently attached to a second component of the base by a plastics over-molding process to form a single integral piece. In the illustrated embodiment, the second component includes each of the first region 42, the lip 29, the structure 31 and the receiving element 46.

According to one embodiment, the first region 38 is sealed to a wall 40 of an inflatable device. Further, the first region 38 can provide a flange for attachment to the inflatable device. For example, according to one embodiment, the first region 38 of the base 16 and the wall 40 of the inflatable device are each manufactured from thermoplastic material and the first region 38 and the wall 40 are heat sealed together, however other attachment means can be employed in one or more alternate embodiments so long as they provide a fluid-tight seal for the operating pressures of the inflatable device. In one embodiment, the first region 38 is heat-sealed to a wall 40 of an inflatable device using a radio-frequency (RF) heat sealing process.

According to one embodiment, the first region 38 is manufactured with a material that differs from the material that the remainder of the base 12 is constructed from. For example, where the valve 10 is included in an inflatable device having a fluid impermeable bladder manufactured from PVC, the first region 38 can be manufactured from PVC so that it will readily seal in a fluid-tight fashion with the bladder. According to this embodiment, the first region 38 is manufactured from a material that is less rigid than the material of the remainder of the base. In another embodiment, each of the bladder and the first region 38 are manufactured from injected polyurethane.

The valve 10 can be located at any surface of an inflatable device. For example, in one embodiment, the inflatable device is a body support comfort device and the valve 10 is located at the support surface of the inflatable device. The valve 10 can also be located at any other surface of the inflatable device which is accessible to a user. Further, the valve 10 can be employed with all varieties of body support comfort devices including mattresses, pillows, seats, backrests, etc. and multi-bladder variations of any of the preceding.

According to the illustrated embodiment, the seal 14 includes an overall arcuate shape, for example, roughly similar to the letter "C" when viewed in cross section. When viewed in cross section, the first region 41 is configured to engage the cap 12 and the second region 43 is configured to engage the base 16. According to one embodiment, each of the first region 41 and the second region 43 of the seal 14 has a "hook" like shape. However, other shapes can be used provided that they facilitate a deformation of the seal 14 upon attachment of the cap 12 to the base 16 and allow for the establishment of a fluid-tight seal when the valve is closed.

According to one embodiment, the peripheral region 19 includes a projection or plurality of projections 52 such as, for example, a rib, lip or other structure that generally projects radially inward from an underside of the rim 17 to engage the seal 14. In some embodiments, the projection 52 retains at least a first portion of the at least one first region 41 when the seal is secured to the cap 12. According to a further embodiment, the rim 21 (see FIG. 1) includes an interior cavity 54 which is at least partly arcuate in shape.

Further, in some embodiments, the interior cavity 54 is configured to engage the first arcuate surface 58 of the seal 14. In some embodiments, the slot 23 is configured to receive the at least one first end region 41, or portion thereof.

According to some embodiments, the seal 14 is retained by the cap 12 in either a permanent or semi-permanent manner. According to some of these embodiments, the base 16 can also be configured to capture at least a portion of the seal 14. For example, in the illustrated embodiment, the recessed portion 44 of the second region 42 is configured to receive the second end region 43 of the seal 14. This can be accomplished by for example, proper alignment of the cap 12 with the base 16 when as the cap 12 is attached to the base. Further, this configuration can act to fix a location of the second end region 43.

Figure 3A:
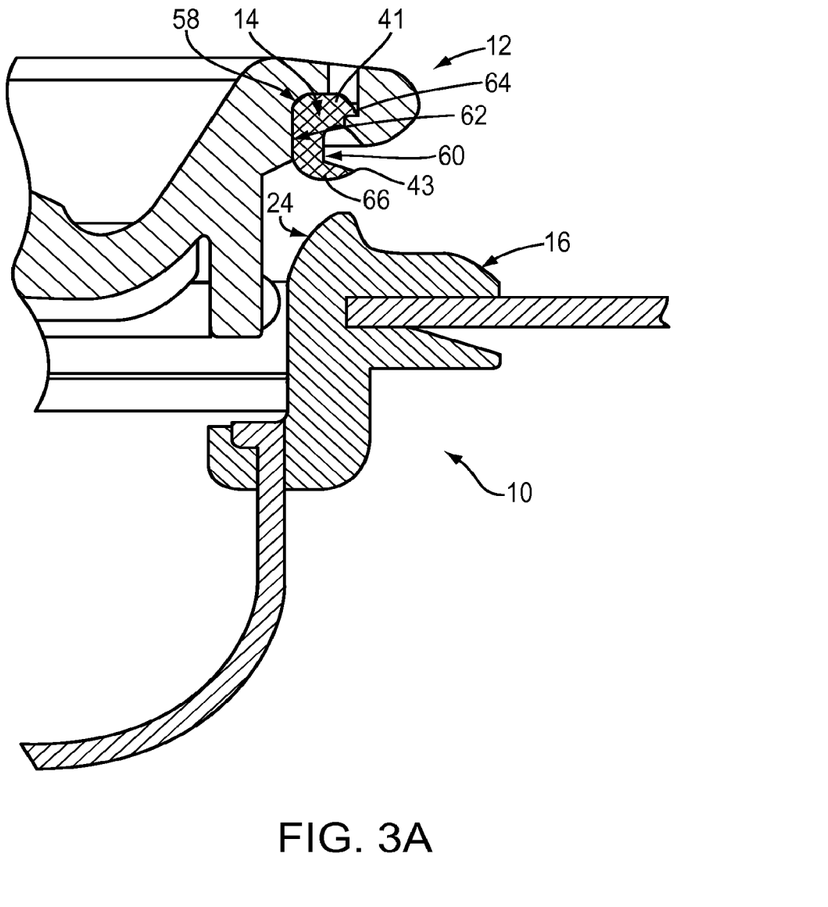
FIG. 3A illustrates a cross-sectional view of a portion of a valve in accordance with another embodiment of the valve illustrated in FIG. 1.
Figure 3B:
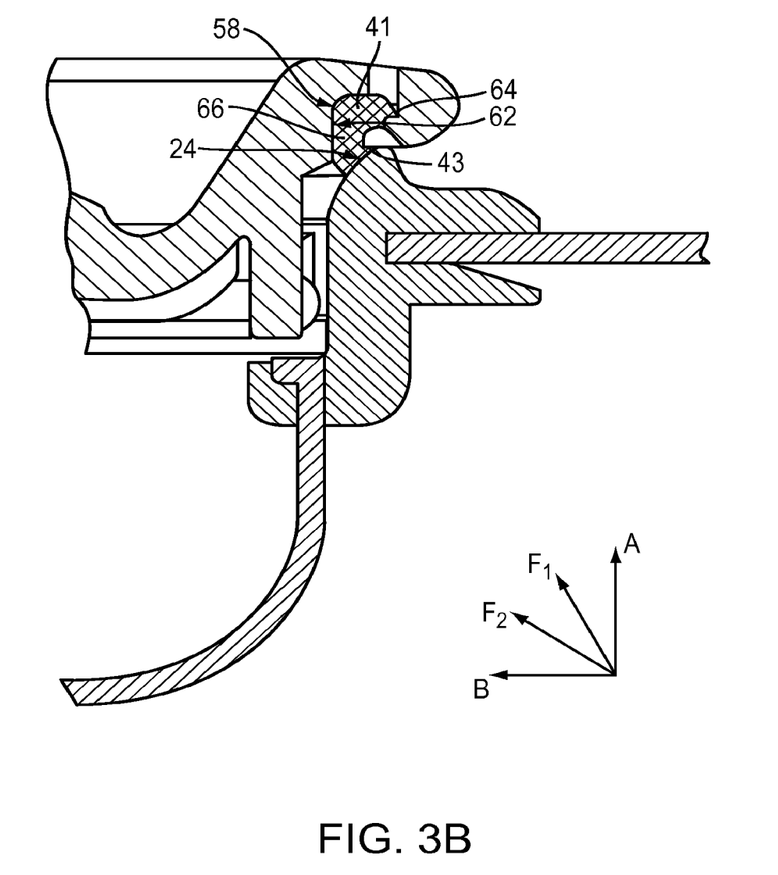
FIG. 3B illustrates a further cross-sectional view of a portion of a valve in accordance with the embodiment illustrated in FIG. 3A.

Referring now to FIGS. 3A and 3B, the valve 10 is illustrated in accordance with further embodiments. FIG. 3A illustrates the valve 10 prior to the cap 12 being attached to the base 16 while FIG. 3B illustrates the valve 10 with the cap 12 attached to the base 16. In the illustrated embodiment, the base 16 does not include a recessed portion 44 to capture a portion of the seal 14. Instead, the second end region of the seal 14 is pressed against the inner face 24 when the cap 12 is attached to the base 16 as illustrated in FIG. 3B According to some embodiments, the overall shape of the seal is similar to the letter C and the seal includes, a first tip 64 located at an end of the first end region 41, a second tip 66, located at an end of the second end region 43, the first arcuate surface 58 and a second arcuate surface 60. According to these embodiments, the seal 14 also includes the at least one first end region 41 and the second end region 43. In the illustrated embodiment, the second end region 43 can move freely while the at least one first end region is attached to the cap 12. Further, each of the first arcuate surface 58 and the second arcuate surface extend from the first tip 64 to the second tip 66 in the illustrated embodiment which provides the seal with a generally convex shape in the region of the first arcuate surface 58 and a generally concave shape in the region of the second arcuate surface 60. Further, FIGS. 3A and 3B also illustrate a surface 62 of the cap 12. According to some embodiments, the surface 62 provides a surface that the seal 14 is pressed against in a fluid-tight manner when the valve is closed. In some embodiments, the first tip 64 of the seal 14 includes a projection, cutout, notch or other structural feature that is used to assist in the capture and retention of the seal 14 by the cap 12.

According to some embodiments, the act of closing the valve to form a fluid tight seal results in a force being applied to the seal 14 which causes the seal 14 to deform as it is pressed between the cap 12 and the base 16. According to some embodiments, the deformation of the seal 14 results in a force being applied between the seal 14 and at least one of the cap 12 and the base 16 in a direction that is not parallel to the axis A. This force can provide a fluid-tight seal. For example, where the surface 62 is substantially parallel with the axis A, the force can be substantially perpendicular to the surface 62.

Referring again to FIG. 3B, the seal 14 includes a spine 66. In FIG. 3B, the second end region 43 of the seal 14 is compressed against the inner face 24 of the base 16. As illustrated in FIG. 3B, when the cap 12 is threaded to the base 16, the seal 14 deforms as it attempts to bend back on itself and the distance between the first region 41 and the second region 43 decreases, that its, the tips 64 and 66 are pressed towards one another. During the threading operation, the at least one first region 41 remains a fixed distance from the axis A in the recessed portion 44 of the base 16, however, a distance between the second end region 43 and the axis may decrease. The distance between the rim 21 (see FIGS. 1 and 2) of the cap 12 (including the interior cavity 54) and the inner face 24 of the base 16 decreases during the threading operation used to close the valve 10. According to some embodiments, the first region 41 is in a fixed location relative to the cap 12 when it is retained by the projection 52. As a result, the overall axial movement of the cap 12 relative to the base 16 results in increased pressure between the cap 12 and the seal 14 at the first arcuate surface 58 when the seal 14 deforms as the second end region 43 is pressed against the inner face. According to some embodiments, the spine 66 is a region of the seal 14 about which the second end region 43 pivots as it is pressed in the general direction of both the axis A and the at least one first end region 41.

According to some embodiments, the cavity 54 is at least partly defined by a wall in the cap 12 that is substantially parallel to the axis A and provides at least a part of the surface 62 against which the seal 14 is pressed when the valve 10 is closed. Thus, the surface 62 is employed to create a fluid-tight seal when the valve is closed. According to these embodiments, the overall axial travel of the cap relative to the base when closing the valve results in a sealing force that is in a direction that is substantially perpendicular to the axis A.

In some embodiments, the cavity 54 can be defined by wall that has a first section that is flat and a second section that is arcuate in shape. Further, each of the first section and the second section can be employed to create a fluid-tight seal with the seal 14. According to another embodiment, the cavity can include a wall that is solely arcuate in shape to provide the surface 62. In addition, according to some embodiments, the seal 14 can include the at least one first end region 41 having an arcuate shape and the second end region 43 having an arcuate shape where the two end regions are separated by a central region that has at least one straight side when viewed in cross-section. In some embodiments, the central region has at least two flat sides. In a further embodiment, the two flat sides oppose one another. Accordingly, the fluid-tight seal can be provided when the sealing force includes both a first force in a direction that is substantially perpendicular to the axis A and a second force in a direction that is not substantially perpendicular to the axis A.

In some embodiments, the fluid-tight seal between the cap 12 and the base 16 is created when a first sealing force is created between the inner face 24 and the second end region 43 and a second sealing force is created between the first arcuate surface 58 and the surface 62 where the first sealing force and the second sealing force are in directions that do not directly oppose one another. For example, the first sealing force can be substantially perpendicular to the axis A while the second sealing force is not substantially perpendicular to the axis A, or vise versa. FIG. 3B provides a coordinate system including a first axis A which is parallel to the central longitudinal axis of the orifice 20, a second axis B which is perpendicular to the axis A and vectors $F_1$ and $F_2$. According to some embodiments, the sealing forces created with the deformation of the seal 14 between the cap 12 and the base 16 can be represented by force vectors in any of the directions provided by the first axis, the second axis and other vectors radiating from the intersection of the axes A, B in the direction of the first arcuate surface 58. Accordingly, the seal 14 can be pressed within the cavity 54 against the wall provided in the cap 12 in the directions defined by these vectors. The configuration of the seal 14 also results in sealing forces being applied by the seal 14 on the sealing surface 24 of the base 16 in a direction opposite those illustrate by the coordinate system.

Referring again to FIG. 2, according to some embodiments, the receiving element 46 provides a location for an attachment of the second end 30 of the connector 18 to the base 16. In the illustrated embodiment, the lip 46 includes an opening through which the second end 30 of the connector 18 is inserted. Further according to the illustrated embodiment, the connector 18 has a generally arcuate shape (for example, a "u-shape"). However, according to this embodiment, the overall direction of the connector 18 extends radially inward from the base 16 to the central longitudinal axis A of the valve 10 where the connector 18 is fastened to the cap 12. In one embodiment, the valve includes a fastener 48 (such as a bolt or screw) which is received by the cap 12. According to this embodiment, the first end 28 of the connector 18 includes an opening through which the fastener 48 is inserted to attach the first end 28 to the cap 12.

According to some embodiments, the connector 18 is disposed within an interior of the inflatable device when the cap 12 is secured to the base 16. Further, in some embodiments, the fastening of the first end 28 of the connector allows the fastener 48 and the cap 12 to remain fastened together in a fixed orientation relative to one another while freely rotating about the first end 28. Thus, the connection of the cap 12 and the base 16 via the connector 18 does not interfere with the opening and the closing of the valve 10.

Figure 4:
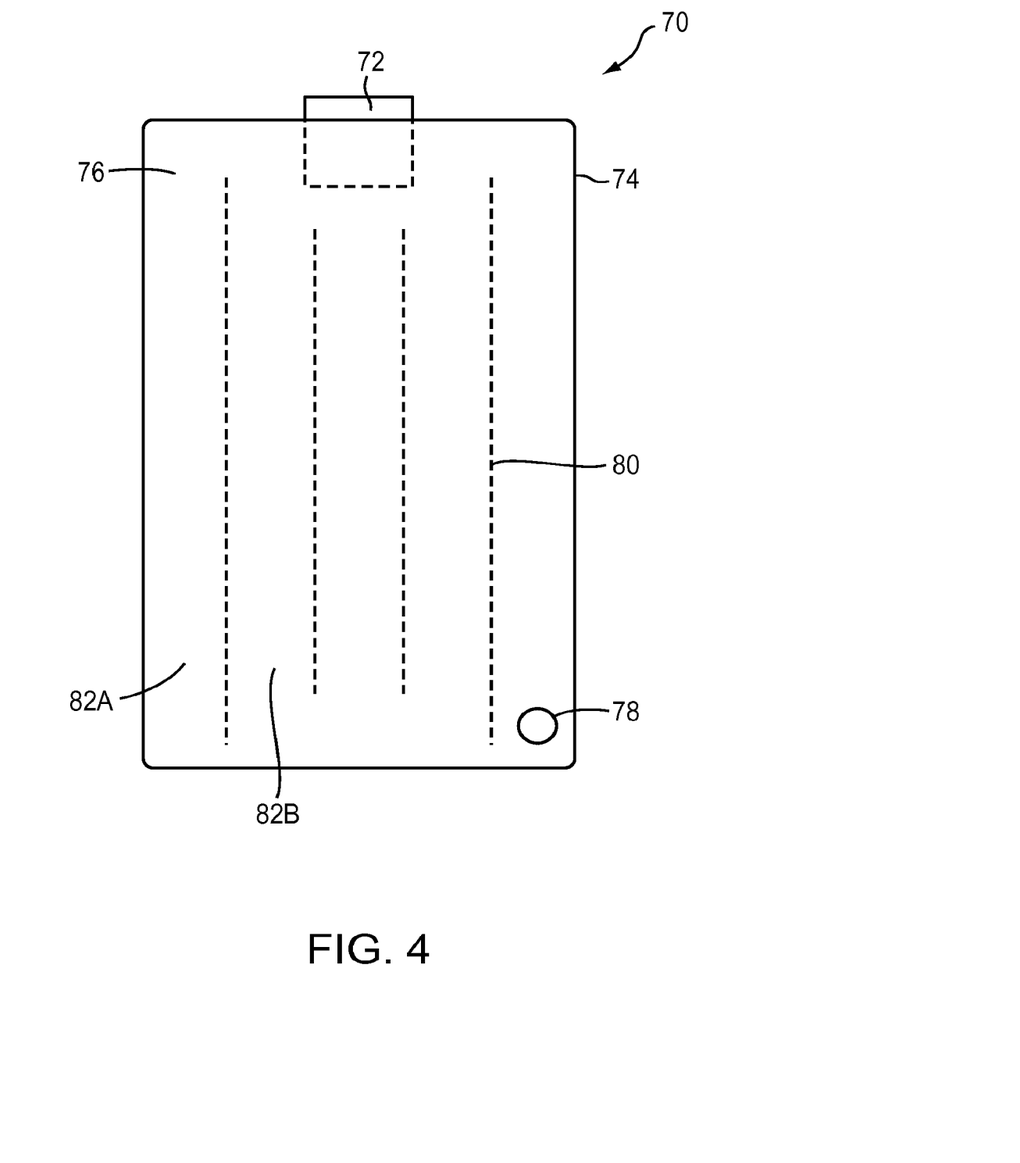
FIG. 4 illustrates an inflatable device in accordance with one embodiment.

Referring now to FIG. 4, an inflatable device 70 is illustrated in accordance with various embodiments that can include the valve 10. According to the illustrated embodiment, the inflatable device 70 includes the fluid controller 72, and a fluid impermeable bladder 74 that defines a first chamber 76. According to other embodiments, the inflatable device 70 does not include an integral fluid controller. In accordance with one embodiment, the inflatable device 70 is an inflatable mattress, however, the inflatable device can take the form of any of a variety of inflatable devices configured to support at least a portion of a user.

In accordance with the illustrated embodiment, the inflatable device 70 also includes an outlet valve 78, for example, an embodiment of the valve 10. It should be apparent that where the fluid controller 72 is configured for both inflation and deflation of the inflatable device 70, the outlet valve 78 may or may not be included. According to one embodiment, the fluid controller 72 is configured for both inflation and deflation of the first chamber. According to this embodiment, the fluid controller 72 allows a user to release fluid from the first chamber 76 for comfort control while the outlet valve 78 is employed as a "dump" valve to provide rapid deflation of the inflatable device 70. According to one embodiment, the outlet valve is included in the fluid controller 72 where the outlet valve includes an embodiment of the valve 10. According to these embodiments, the fluid controller 72 can be located at least partly within a profile of the first chamber 76. According others of these embodiments, all or a majority of the fluid controller is located within the profile of the first chamber 76. The inflatable device can also include internal dividers or baffles 80 that can be used to define internal chambers 82A, 82B. Further, the inflatable device can include chambers that are fluidly isolated from one another. According to these embodiments, the inflatable device can be included with a separate outlet valve for each of the chambers. Where separate chambers are included, the inflatable device may include upper and lower chambers, for example, a support chamber and a comfort control chamber. Also, the valve can be included in inflatable devices that include adjacent chambers, for example, a double, queen or king size mattress. As described above, multiple valves 10 can be employed with the preceding configurations to allow pressure control and/or deflation of the chambers independently of one another.

According to the above-embodiments, the valve can be used in inflatable devices designed to support users where the inflatable devices are filled with gaseous fluids such as air or liquid fluids such as water. The valve 10 can also be used with other fluids.

According to any of the preceding embodiments, the seal 14 can be configured to provide a gasket having a circular or ring-shape.

Further, according to some embodiments, a self sealing valve can be included in the cap 12 of the valve 10, for example, the self-sealing valve can be used to provide comfort control. As used here, the term self sealing refers to a valve which can automatically close to provide a fluid-tight seal once the force used to open the valve is released. Such valves can include spring loaded valves or valves with a diaphragm structure that automatically biases the valve closed when the opening-force is removed. According to these embodiments, the valve 10 can be manually operated to separate the cap 12 from the base 16 while also allowing the self sealing valve to be temporarily opened (manually or otherwise) with the cap 12 attached to the base 16 in a fluid-tight manner.

According to yet another embodiment, a self sealing valve is included in the base 16 in a recessed manner and the cap 12 is connected to the base 16 to isolate the self-sealing valve from the external environment when the self sealing valve is not in use.

In addition, while the valve 10 is illustrated as having a threaded coupling between the cap 12 and the base 16 other configurations can be employed to achieve a fluid-tight seal. For example, a press-fit between the cap 12 and the base 16 using an axial and/or pivoting motion can be employed where the seal 14 is configured for a deformable operation as shown herein. That is, a rotational motion is not required to attach the cap 12 to the base 16. In some of these embodiments, the cap 12 and the base 16 include a snap-fit latch that secures the cap 12 and base 16 together in a fluid-tight manner. Further, the preceding embodiment can include a hinged attachment of the cap 12 to the base 16.

According to a further embodiment, the base 16 is manufactured from a relatively soft material such as PVC of the type used to form inflatable bladders. This approach can allow the first region 38 to be formed along with other portions of the base 16 such that an over-molding process need not be employed while still including a flange in the base 16 for sealing the base to the bladder. According to versions of this embodiment, a mechanical stiffener made from a more rigid material is coupled to the base to increase the overall stability of the base 16 and allow it to maintain sufficient structural integrity for use in the valve 10. According to another embodiment, a mechanical stiffener is not employed. According to some embodiments, the seal 14 is manufactured from a rigid material such as ABS where base 16 is manufactured from a softer material.

In accordance with one embodiment, the valve 10 is employed over a pressure range anywhere from approximately 0 to 1 pound per square inch (hereinafter "psi"). According to another embodiment, the valve is employed over a pressure range of 0 to 2 psi while in yet another embodiment the valve is employed over a pressure range of 0 to 5 psi. Accordingly, reference to fluid-tight in various of the preceding embodiments can refer to fluid-tight at any of the above or other pressures.

Having thus described several aspects of at least one embodiment of this invention, it is to be appreciated various alterations, modifications and improvements will readily occur to those skilled in the art. Such alterations, modifications and improvements are intended to be part of this disclosure and are intended to be within the spirit and scope of the invention. Accordingly, the foregoing description and drawings are by way of example only.

What is claimed is:

1. A valve for an inflatable device, the valve comprising:
   a base including a first region configured to seal to a fluid impermeable wall of a bladder of the inflatable device, the base further including a second region that defines an orifice for exhausting fluid from an interior of the inflatable device, the second region configured to provide a sealing surface;
   a cap including a rim, the rim including a generally circular peripheral region including at least one rib located about an underside of the peripheral region and a cavity defined in part by at least one wall located radially inward of the rib;
   a seal including a first end region secured to the cap within the cavity between the at least one wall and the at least one rib and a second end region of the seal is configured to move with the at least one first end region of the seal being secured to the cap within the cavity;
   wherein the second end region of the seal is configured to press into engagement with the sealing surface of the base when the cap is secured to the base to produce a deflection force on the second end region of the seal that has a component that is substantially perpendicular to a central axis of the orifice to provide a fluid tight seal by the deflected second end region of the seal between the cap and the sealing surface of the base.

2. The valve of claim 1, wherein the valve is configured for inflation of the inflatable device using an inflation device.

3. The valve of claim 2, wherein the base is configured to engage the inflation device including at least one of a pump configured to be close-coupled to the base.

4. The valve of claim 1, wherein the at least one wall includes a region that is substantially perpendicular to the central axis when the cap is secured to the base to provide the fluid-tight seal, and
   wherein the force occurs at least between the seal and the region of the wall that is substantially perpendicular to the central axis.

5. The valve of claim 1, wherein the seal includes a first arcuate surface and a second arcuate located on opposing sides of the seal, and
   wherein each first arcuate surface and the second arcuate surface extend from the first end region to the second end region.

6. The valve of claim 5, wherein the first arcuate surface includes a first generally convex shape and the second arcuate surface includes a second generally concave shape.

7. The valve of claim 6, wherein the seal and the base are configured such that the second end region and the first arcuate surface provide a fluid-tight seal with the sealing surface of the base when the cap is secured to the base.

8. The valve of claim 1, wherein the peripheral region includes an underside, and wherein the rim includes a plurality of ribs located about the underside of the peripheral region.

9. The valve of claim 8, further comprising at least one slot located in the peripheral region.

10. The valve of claim 9, wherein the at least one slot includes a plurality of slots.

11. The valve of claim 10, wherein the first end region includes a plurality of projections and a plurality of gaps, and
wherein adjacent projections included in the plurality of projections are separated by a gap included in the plurality of gaps, respectively.

12. The valve of claim 11, wherein each of the plurality of projections is configured to be secured between a corresponding slot included in the plurality of slots and a corresponding rib included in the plurality of ribs, respectively.

13. The valve of claim 12, wherein the seal includes a generally circular shape.

14. The valve of claim 1, wherein the first region includes a flange configured to heat seal to the fluid impermeable wall of the inflatable device,
wherein the first region is included in a first component,
wherein the second region is included in a second component, and
wherein the base is constructed by over molding a plurality of components including the first component and the second component to form a single over-molded piece.

15. The valve of claim 1, wherein the first end and the second end are separated by a first distance with the valve fully open, and
wherein the seal is configured to deform such that the first end and the second end are separated by a second distance that is less than the first distance when the cap is secured to the base to provide a fluid-tight seal.

16. The valve of claim 15, wherein the seal includes at least one spine, and
wherein the seal is configured to fold along the spine to reduce a distance between the first end and the second end when the cap is secured to the base.

17. The valve of claim 1, wherein the inflatable device includes a mattress and a fluid controller included in the mattress.

18. The valve of claim 17, wherein the valve is included in the fluid controller.

19. The valve of claim 18, wherein the fluid controller is recessed within a profile of the bladder.

20. The valve of claim 1, wherein the base is configured to heat seal to the fluid impermeable wall.

21. The valve of claim 1, wherein the valve is a large-orifice exhaust valve with an orifice-diameter of at least 7.62 centimeters.

22. The valve of claim 21, wherein the base and the cap are configured to be secured to one another in a fluid-tight arrangement via at least one of a full set of threads, a partial set of threads and a bayonet mount.

23. The valve of claim 22, wherein the seal is configured to allow a deformation of the second end region between the sealing surface and the at least one wall.

24. The valve of claim 23, wherein the base and cap are secured together to provide the fluid-tight seal using a rotational force that is at least 25% less than a rotational force required to close a conventional large-orifice exhaust valve that is configured to compress a gasket in an axial direction to close the conventional exhaust valve.

* * * * *